United States Patent [19]

Nagoshi

[11] Patent Number: 4,772,900

[45] Date of Patent: Sep. 20, 1988

[54] INK-JET RECORDING APPARATUS

[75] Inventor: Shigeyasu Nagoshi, Tokyo, Japan

[73] Assignee: Canon Kabushiki Kaisha, Tokyo, Japan

[21] Appl. No.: 920,126

[22] Filed: Oct. 17, 1986

[30] Foreign Application Priority Data

| | | | |
|---|---|---|---|
| Oct. 22, 1985 | [JP] | Japan | 60-234494 |
| Oct. 22, 1985 | [JP] | Japan | 60-234495 |
| Jan. 10, 1986 | [JP] | Japan | 61-3343 |

[51] Int. Cl.⁴ ..... G01D 15/18

[52] U.S. Cl. ..... 346/140 R; 346/75

[58] Field of Search ..... 346/140 R, 140 PD, 75; 307/117

[56] References Cited

U.S. PATENT DOCUMENTS

| | | | |
|---|---|---|---|
| 2,157,549 | 5/1939 | Lindenblad | 346/140 X |
| 3,771,568 | 11/1973 | Bischoff et al. | 346/76 X |
| 4,314,263 | 2/1982 | Carley | 346/140 PD |
| 4,342,042 | 7/1982 | Cruz-Uribe et al. | 346/140 PD |
| 4,390,922 | 6/1983 | Pelliccia | 307/117 X |
| 4,551,734 | 11/1985 | Causley et al. | 346/140 R |
| 4,593,294 | 6/1986 | Parisi | 346/140 PD |

*Primary Examiner*—Philip H. Leung
*Assistant Examiner*—Derek S. Jennings
*Attorney, Agent, or Firm*—Fitzpatrick, Cella, Harper & Scinto

[57] ABSTRACT

An ink-jet recording apparatus has a level gauge communicating with both an ink storage unit and the atmosphere in order to detect the amount of remaining recording ink in the ink storage unit, and a sealing device for shielding the interior of the level gauge from the atmosphere.

20 Claims, 6 Drawing Sheets

FIG. 3
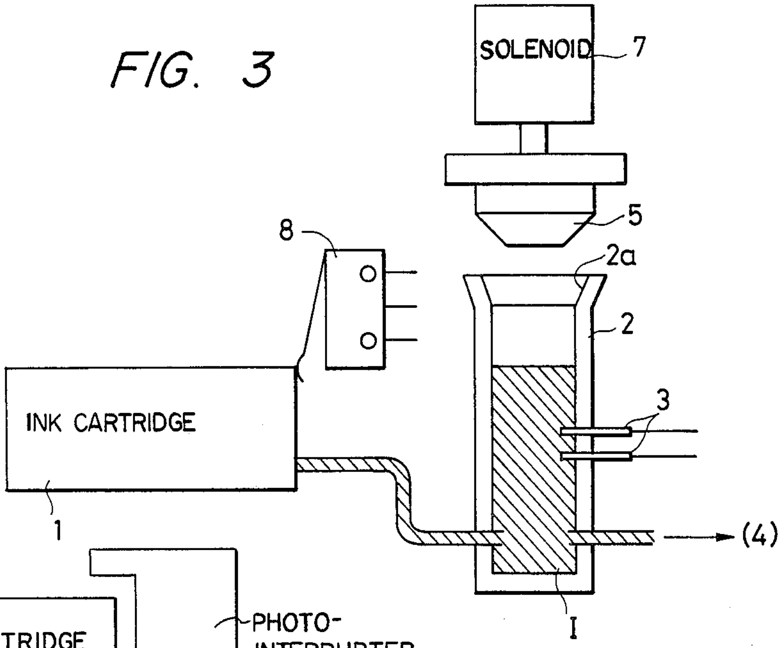
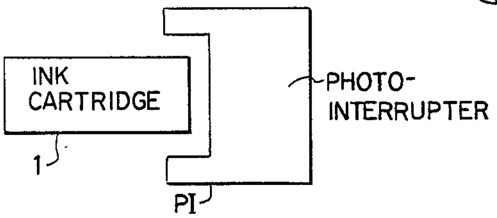
FIG. 3A
FIG. 5
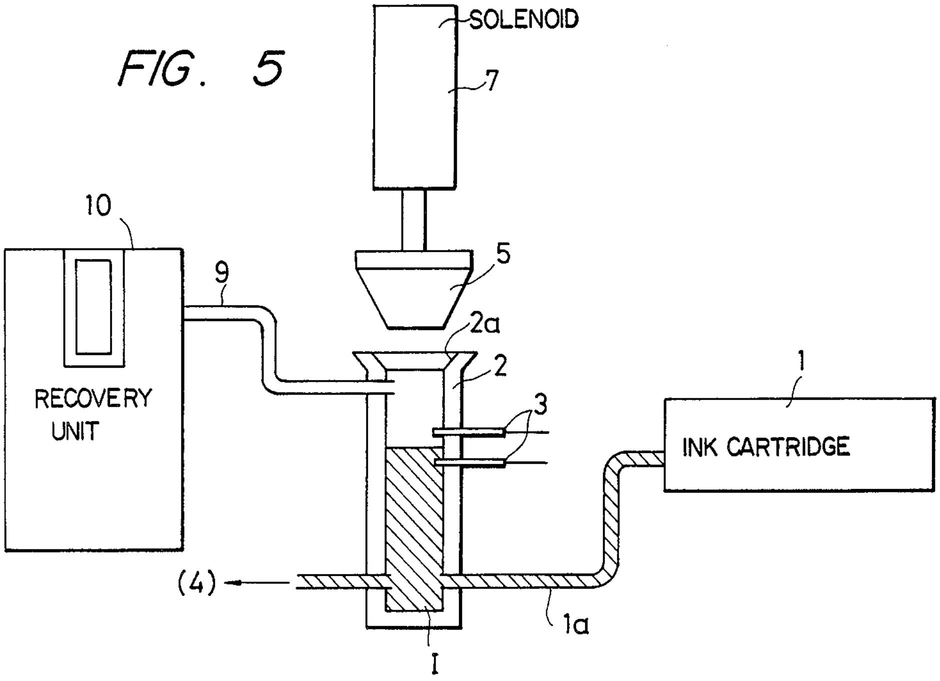

INK-JET RECORDING APPARATUS

BACKGROUND OF THE INVENTION

1. Field of the Invention

The present invention relates to an ink-jet recording apparatus and, more particularly, to an ink-jet recording apparatus having an ink storage means and a liquid gauge (to be referred to as a manometer hereinafter) communicating with ambient air.

2. Related Background Art

Various types of ink-jet recording apparatus are known as recording apparatuses using liquid ink as the recording material. In an arrangement proposed for such apparatuses, the remaining amount of ink as the recording material is detected, as in apparatuses of the other types.

FIG. 1 shows a conventional arrangement for detecting a remaining ink amount in a removable ink cartridge 1 for storing recording ink. An ink flow path 1*a* extending from the ink cartridge 1 guides ink I from the cartridge 1 to a cylindrical upright manometer 2 by gravity and the ink I in the manometer 2 is supplied to an ink-jet printing head (not shown) therefrom. The upper end (and its vicinity) of the manometer 2 is open and communicates with ambient air. Therefore, the liquid level of the ink I in the manometer 2 coincides with that in the ink cartridge 1.

Thus, when two electrodes 3 are vertically aligned in the manometer 2 and a resistance thereacross is detected, the remaining amount of the ink cartridge 1 can be detected. At least the upper electrode 3 is arranged at such a position that it can detect the remaining amount when a predetermined amount of ink is remaining in the cartridge 1.

With the above arrangement, however, since the upper end of the manometer 2 is open, if the ink cartridge 1 is removed so that it can be changed, ink leakage can occur from ink flow paths of the printing head side or the cartridge side, or from the opening of the manometer 2, thus soiling the interior of the apparatus or short-circuiting the internal circuit.

Furthermore, with the above arrangement, when the amount of remaining ink of the ink cartridge 1 reaches a predetermined value, cartridge change is performed. In this case, the ink liquid level on the manometer 2 is decreased to a position indicating that it contains little remaining ink, and at least one electrode 3 is exposed from the ink surface.

When the cartridge 1 is changed, the ink I flows into the manometer 2 from the ink cartridge 1 through the flow path 1a by natural falling, and the ink levels in the cartridge 1 and the manometer 2 become equal to each other. Conventionally, however, since ink is supplied from a new cartridge into the manometer 2 by gravity, it takes some time before the liquid levels become equal, and some times the apparatus is caused to enter an alarming state, representing the little remaining ink, is caused by erroneous detection and continues even after cartridge replacement.

When the ink cartridge is removed for replacement, the atmospheric pressure acts on the ink in the manometer, and ink leakage can thus occur from the ink flow paths of the printing head side or the cartridge side, thus soiling the interior of the apparatus or short-circuiting the internal circuit. If the apparatus is inclined during change, ink may overflow from the opening of the manometer.

SUMMARY OF THE INVENTION

It is an object of the present invention to provide a liquid jet recording apparatus which can reliable prevent the interior of the apparatus from being soiled by ink leakage by providing a level gauge communicating with both an ink storage means and the air, and prevent the short-circuiting of the internal circuit.

It is another object of the present invention to provide a liquid jet recording apparatus having a level gauge wherein the liquid level is increased immediately after the ink storage means is changed.

It is still another object of the present invention to provide a liquid jet recording apparatus wherein ink evaporation from a liquid gauge is prevented.

It is still another object of the present invention to provide an ink-jet recording apparatus wherein an erroneous detection state, which occurs when little or no remaining ink is in the system after replacement of an ink storage means, is eliminated.

It is still another object of the present invention to provide an improved ink-jet printer wherein no ink leakage occurs even if the printer is inclined during its operation or a strong vibration is externally applied.

It is still another object of the present invention to provide an ink-jet recording apparatus having a liquid gauge communicating with both an ink storage means and the air for detecting the amount of remaining ink, wherein a sealing means for shielding the interior of the liquid gauge from the air is provided.

It is still another object of the present invention to provide an ink-jet recording apparatus having a liquid gauge communicating with both an ink storage means and the air for detecting the amount of remaining ink, wherein the apparatus has a sealing means for shielding the interior of the level gauge from the air, and an inclination detecting means for detecting the inclination or vibration when the ink-jet recording means is operating or is turned on, and thus, controlling the operation of the sealing means in accordance therewith.

BRIEF DESCRIPTION OF THE DRAWINGS

FIGS. 2 to 7 are schematic diagrams of a part of the present invention including a level gauge in an ink-jet recording apparatus according to the present invention;

DETAILED DESCRIPTION OF THE PREFERRED EMBODIMENT

Figure 1:
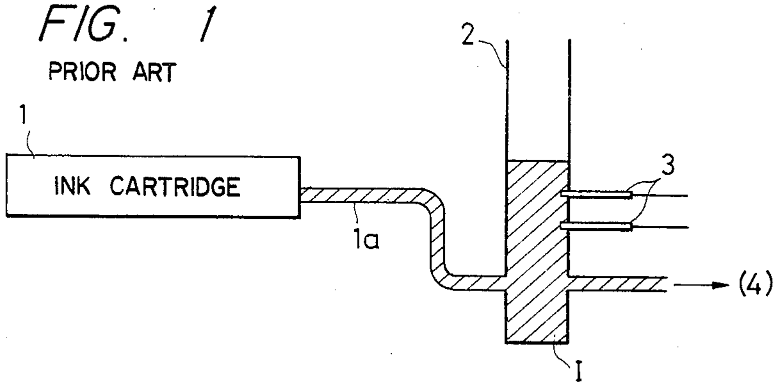
FIG. 1 PRIOR ART
FIG. 1 is a schematic diagram of a part of the present invention including a level gauge in a conventional ink-jet recording apparatus.

In order to solve the above problems, in an ink-jet recording apparatus having a level gauge communicating with both an ink storage means and the air for detecting the amount of remaining ink according to the present invention, and a sealing means for shielding the interior of the level gauge from the air, is provided.

With this arrangement, since the air-communicating portion of the manometer is sealed, the interior of the apparatus is reliable prevented from being soiled by ink leakage from the manometer, and short-circuiting of the internal circuit is also reliably prevented.

Furthermore, in order to solve the above problems, in an ink-jet recording apparatus having a level gauge communicating with both a removable ink storage means and the air for detecting the amount of remaining ink, a sealing means for shielding the interior of the level gauge from the air and a suction means communicating with the level gauge, are provided, and the suction means is driven when the ink storage means is mounted, in order to forcibly increase the ink level in the level gauge.

With this arrangement, since the level in the level gauge which was at a lower position is increased immediately after the ink storage means is changed, the level gauge does not indicate a small amount of remaining ink for a long period of time after the ink storage means is changed. Also, the sealing means prevents accidental ink leakage when the ink storage means is changed.

(EMBODIMENTS)

Embodiments of the present invention will be described in detail with reference to the accompanying drawings. In the following description, the same reference numerals denote the same or equivalent portions as in the conventional apparatus, and a detailed description thereof is omitted.

EMBODIMENT 1

Figure 2:
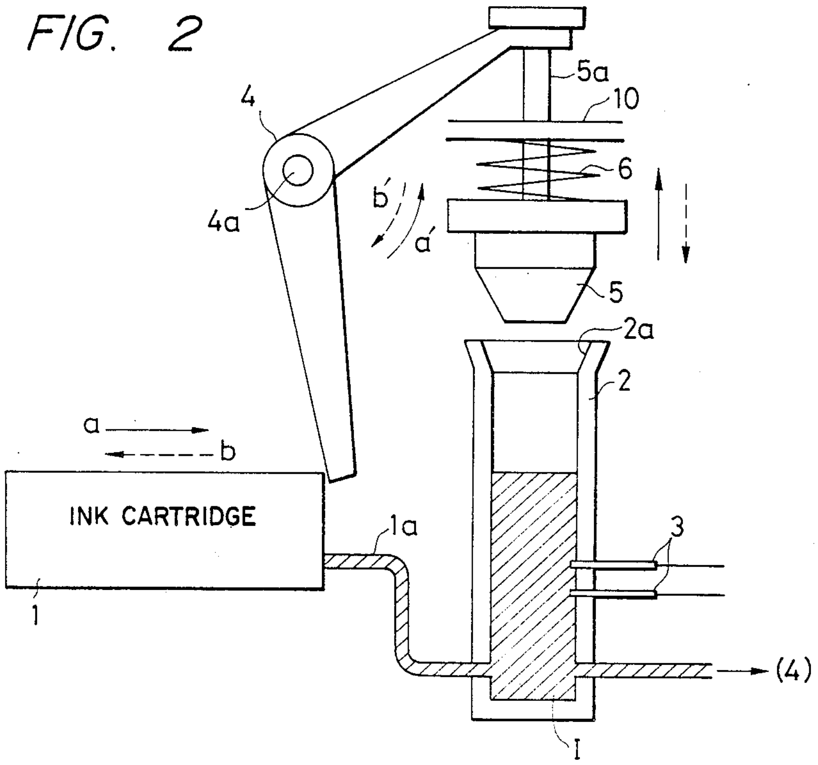

FIG. 2 shows an ink-jet recording apparatus according to a first embodiment of the present invention.

In the first embodiment, an upper opening 2*a* of a manometer 2 having electrodes 3 for detecting the amount of remaining ink is tapered, and can be sealed by a tapered cap 5 made of a material such as rubber.

The cap 5 is fixed on the distal end of a shaft 5*a*, and is biased toward the inside of the opening 2*a* by a compression spring 6 mounted between the shaft 5*a* and an apparatus chassis 10.

An ink cartridge 1 is removably coupled to an ink flow path 1*a* through a coupling using a needle socket or the like at the end portion of the flow path 1*a*.

The ink cartridge 1 is urged in the direction of arrow a when it is mounted on the ink flow path 1*a*, and is pulled out in the direction of arrow b when it is removed from the path 1*a*. One end of an L-shaped lever 4, pivotally supported by a shaft 4*a*, abuts against the end of the ink cartridge 1, in order to transmit the reciprocal movement of the ink cartridge 1.

The other end of the lever 4 is coupled to the end of the shaft 5*a* of the cap 5. The end of the lever 4 which abuts against the cartridge 1 is moved by the biasing force of the compression spring 6 in accordance with the movement of the cartridge 1.

With the above arrangement, when the ink cartridge 1 is pulled out in the direction b for replacement of the cartridge, the lever 4 is pivoted in a direction b' by the compression spring 6, and the cap 5 is moved downward simultaneously. The above interlinked relation is adjusted such that the cap 5 seals the opening 2*a* of the manometer 2 before the cartridge 1 is separated from the flow path 1*a*. As a result, the liquid level in the manometer 2 is lowered by the atmospheric pressure supplied from the opening 2*a*, and the leakage of the ink I from the ink flow path of the recording head side or the cartridge 1 side can be prevented. Ink leakage from the opening 2*a* due to vibration or the like is also prevented.

When a new cartridge 1 is pushed in the a direction to mount the same on the ink flow path 1*a*, the abutting end of the lever 4 is pushed in the a direction, and the level 4 is entirely pivoted in the a' direction, thereby removing the cap 5 from the opening 2*a* through the shaft 5*a*. Thus, the interior of the manometer 2 is communicated with the air, and the liquid level of the ink I in the manometer 2 is displaced to coincide with that in the ink cartridge 1. Therefore, when a resistance across the electrodes 3 is detected, the amount of remaining ink in the ink cartridge 1 can be detected using the manometer 2.

In the above manner, ink leakage during an ink cartridge change can be reliably prevented.

EMBODIMENT 2

In the first embodiment, the opening of the manometer is opened/closed in accordance with mounting-/removal of the ink cartridge using a mechanical interlink mechanism. In the second embodiment, an electrical interlink mechanism is used.

In the arrangement shown in FIG. 3, a cap 5 is fixed on the shaft of a solenoid 7. When the solenoid 7 is energized, it moves the cap 5 upward and opens the manometer 2; when it is deenergized, it moves the cap 5 downward by the biasing force of its internal spring or the like, thereby sealing an opening 2*a* of the manometer 2.

The mounting/removal of an ink cartridge 1 with respect to a predetermined position is detected by a limit switch 8. This detection mechanism can be replaced by another mechanism such as a photo interrupter PI, as shown in FIG. 3A.

The interlinked relation between the limit switch 8 and the solenoid 7 is set as follows.

First, when it is detected by the limit switch 8 that the ink cartridge 1 is mounted, the solenoid 7 is driven to move the cap 5 upward and hence to open the opening 2*a* of the manometer 2. When the ink cartridge 1 is pulled out from its lower position and moved for a change of the cartridge, it is detected by limit switch 8 to immediately deenergize the solenoid 7 and to move the cap 5 downward by a spring or the like in the solenoid 7, thereby sealing the opening 2*a* of the manometer 2.

This interlinked relation is similar to that of the first embodiment. However, in this embodiment, since the solenoid 7 is controlled by a main power source of the apparatus, when the main power source is turned off, the solenoid 7 is deenergized to seal the opening 2*a* of the manometer 2 with the cap 5.

Therefore, when the apparatus is to be moved, even when the apparatus is vibrated or inclined, if the main power is turned off, no ink leakage occurs from the opening 2*a* of the manometer 2. Furthermore, even when the apparatus is not used for a long period of time, evaporation of ink is prevented. Ink leakage upon a change of the ink cartridge 1 is reliably prevented by the interlinking operation similar to that of the first embodiment.

As is apparent from the above effect, in an ink-jet recording apparatus of the present invention which has a level gauge communicating with both an ink storage means and the air for detecting the amount of remainng ink, a sealing means for shielding the level gauge from the air is provided. Therefore, during a change of the ink storage means or the like, the apparatus is reliably prevented from being soiled by ink leakage, and short-circuiting of the internal circuit is also reliably prevented. Furthermore, evaporation of the ink from the level gauge can be prevented.

EMBODIMENT 3

Still another preferred embodiment of the present invention will be described with reference to the accompanying drawings.

Figures 4, 4A:
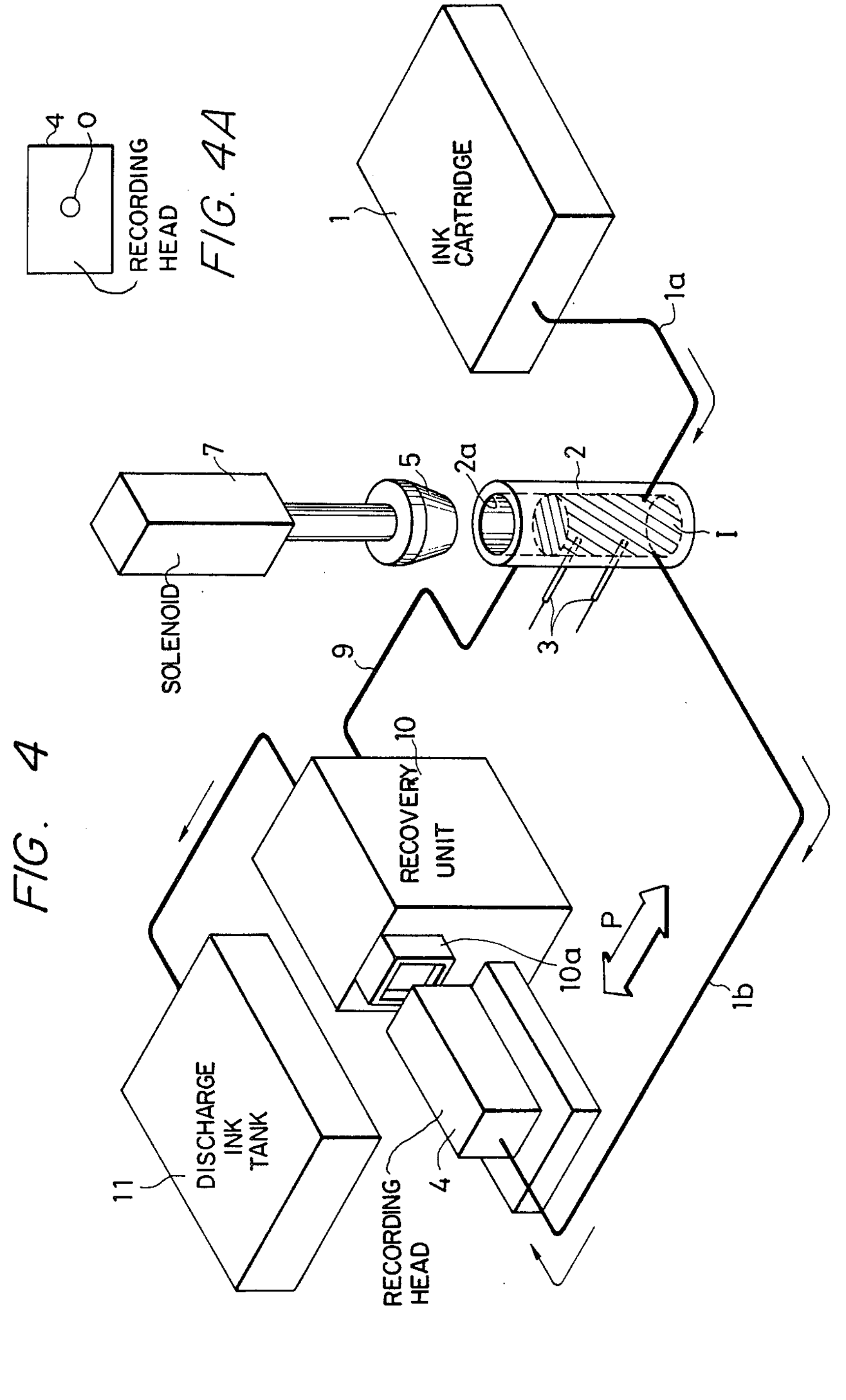

FIG. 4 shows an ink supply system of an ink-jet recording apparatus adopting the present invention. Referring to FIG. 4, an ink cartridge 1 and an ink flow path 1*a* connected to a manometer 2 are removably coupled with each other through a coupling means such as a needle sprocket or the like.

Detecting electrodes 3 are arranged in the manometer 2 in the same manner as in the conventional apparatus. One end of an air path 9 is open in the vicinity of an upper opening 2*a* of the manometer 2.

Ink I in the manometer 2 is supplied to a recording head 4 through a flow pass 1*b*. The recording head 4 is a known ink-jet recording head and forms a printing line on a recording medium (not shown) as it reciprocates in directions P.

The recording head 4 can be positioned opposite from a recovery unit 10, consisting of a pump, etc., outside a scanning range scanned by a drive mechanism (not shown). The recovery unit 10 has a cap 10*a* for sealing an ink discharge port 0 of the recording head 4. The recovery unit 10 supplies a negative pressure to the discharge port of the head 4 in order to prevent clogging of the ink in the head 4 due to ink solidification or bubbles in the ink. Unnecessary ink drawn by suction during this recovery is discharge to a discharge ink tank 11.

In this embodiment, the recovery unit 10 can apply a negative pressure also to the interior of the manometer 2 through the pair path 9. In this case, the opening 2*a* of the manometer 2 is sealed by a cap 5 which can be detachably mounted by a solenoid 7.

Figure 6:
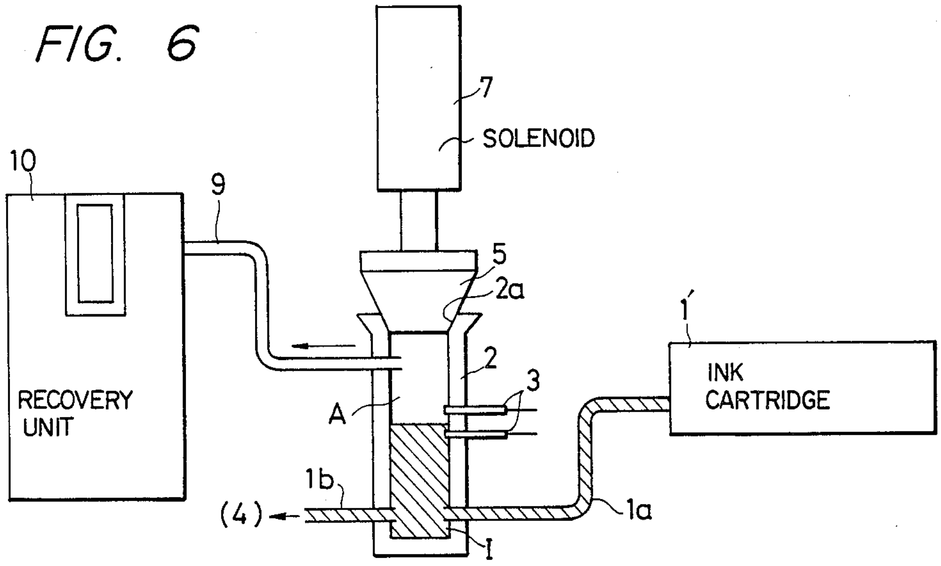

The operation of the above arrangement will now be described with reference to FIGS. 5 to 7.

When the amount of remaining ink in the ink cartridge 1 becomes small, the liquid level of the ink I in the manometer 4 is decreased, as shown in FIG. 5, and an upper electrode 3 is exposed from at least the ink surface.

This operates an alarm mechanism (not shown) to indicate the need for a change of the ink cartridge. In this state, the cap 5 is separated from the manometer 2 by the solenoid 7, and the liquid level in the manometer 2 can be varied in accordance with the ink level in the ink cartridge 1.

The ink cartridge 1 is replaced with a new ink cartridge 1' containing sufficient ink. Prior to this, the cap 5 is moved downward by the solenoid 7, as shown in FIG. 6, and is abutted against the opening 2*a* of the manometer 2, thereby sealing the manometer 2.

Subsequently, the recovery unit 10 is operated to apply a negative pressure to an air layer A at the upper half of the manometer 2 through the air path 9. More specifically, the air in the manometer 2 is drawn through the air path 9, and new ink is supplied to the manometer 2 from the ink cartridge 1' through the ink flow path 1*a* by the suction force. In this case, the recovery operation of the recording head 4 (an operation to draw ink from an orifice (not shown) of the recording head 4 through the recovery unit 10) can be performed simultaneously in order to prevent inverse ink flow through the ink flow path 1*b*.

Figure 7:
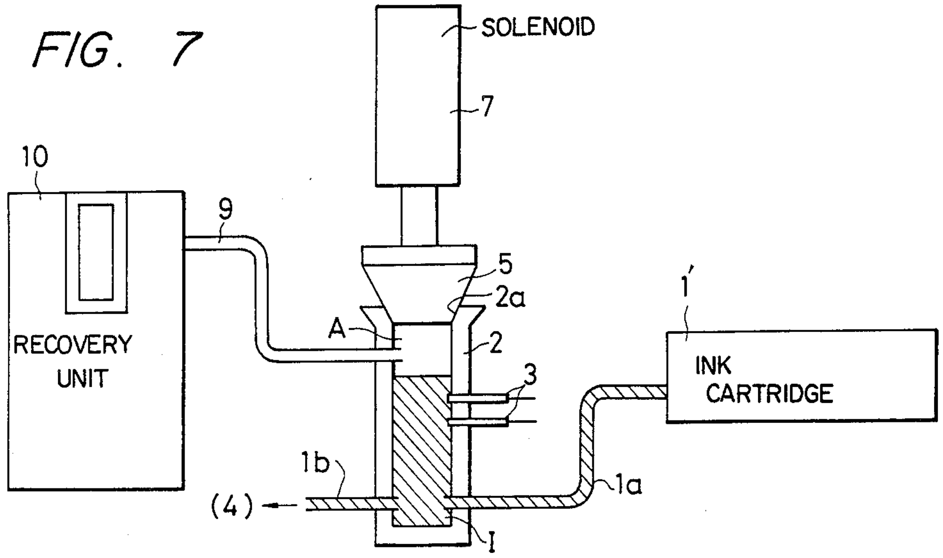

During this ink supplement, when it is checked from the resistance across the electrodes 3 that the ink is supplemented in the manometer to submerge both the electrodes 3 under the liquid surface, as shown in FIG. 7, the suction by the recovery unit 10 is stopped.

Thereafter, the cap 5 is moved upward by the solenoid 7 and the opening 2*a* of the manometer 2 is opened. Then, ink is further supplied from the ink cartridge 1' and the liquid levels in the manometer 2 and the cartridge 1' become equal to each other.

Figure 8:
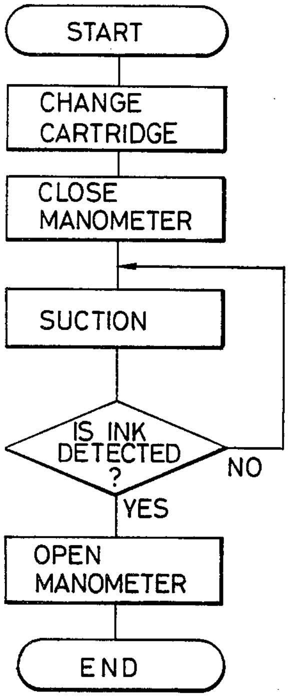
FIG. 8 is a flow chart of a cartridge change procedure of a preferred embodiment of the present invention.

The above procedure is simply shown in the flow chart of FIG. 8, and can be controlled using a control unit which uses a microcomputer. For example, a new cartridge mounting can be detected by a limit switch or the like during cartridge replacement, and the procedures shown in FIG. 8 can be automatically executed. Alternatively, these procedures can be executed by an operation of a predetermined switch after the cartridge is replaced.

With the above arrangement, after a new ink cartridge is mounted, ink is quickly supplied in the manometer to reach the electrodes therein which detect the amount of remaining ink. Therefore, after cartridge replaced, an alarm indicating that there is little remaining ink does not continue. Since the manometer is sealed during ink cartridge replacement, ink leakage is unlikely to occur even if the apparatus is inclined.

As is apparent from the above description, in an excellent ink-jet recording apparatus according to the present invention which has a level gauge communicating with both a removable ink storage means and the air for detecting a remaining recording ink amount, a sealing means for shielding the level gauge from the air and a suction means communicating with the level gauge are provided. When the ink storage means is mounted, the suction means is driven to forcibly increase the ink level in the level gauge. Therefore, an erroneous detection state indicating that there is a small amount of remaining ink does not continue after the ink storage means is replaced. Also, ink leakage is unlikely to occur.

EMBODIMENT 4

When the air-side opening of a manometer (level gauge) 2 is sealed utilizing the movement of a solenoid, as described in the third embodiment, the solenoid is used. However, an additional mechanism or (function) can be added to further prevent ink leakage.

More specifically, in the arrangement of the second and third embodiments described with reference to FIGS. 3 and 4, respectively, when the ink-jet printer is in an inoperative state (i.e. the power source is off), the solenoid 7 is deenergized to cause the cap 5 to seal the air-side open end of the manometer 2. While the printer is operating, however, the air-side open end of the manometer 2 is open, as shown in FIG. 3. Therefore, even if the printer is inclined or vibrated in this state, ink does not overflow from the upper end of the manometer 2 to soil the interior of the printer or causes damage to the respective portions of the printer.

Figure 9A:
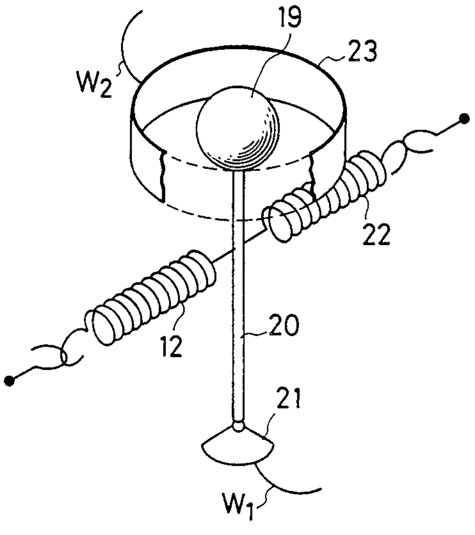
FIG. 9A is a perspective view of an example of an inclination detecting means as an inclination/vibration detector incorporated in an embodiment according to the present invention.

FIG. 9A is a perspective view of an example of an inclination detecting means as an inclination/vibration detector incorporated in this embodiment. The inclination/vibration detector shown in FIG. 9A is of an inverted pendulum type, and has an inverted pendulum comprising a weight 19, a vertical rod 20 for supporting the weight 19, a support base 21 for pivotally supporting the lower end of the vertical rod 20, and a spring 22 for vertically holding the vertical rod 20. The detector also has a cylindrical electrode 23 arranged to surround the weight 19. The weight 19 also serves as an electrode and is connected to an electrical wire W1 extending through a wire hole formed in the vertical rod 20. The electrical wire W1 is connected outside through the support base 21 and is then connected to a printer protective circuit to be described later. A wire W2 connected to the cylindrical electrode 23 is also connected to the protective circuit. In this manner, the weight 19 and the cylindrical electrode 23 constitute a switch responsive to the detector.

When the detector is to be mounted on the printer, a support base 21 is fixed to the base portion of the printer, and a cylindrical electrode 23 is fixed to the upper portion thereof.

Figure 9B:
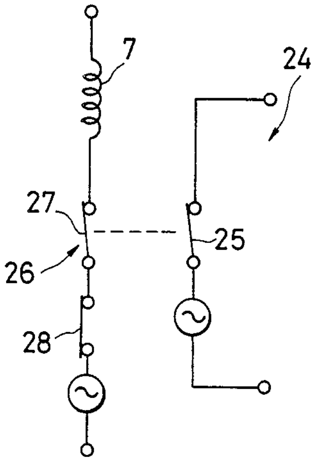
FIG. 9B shows an electrical connection including the detector and solenoid of an embodiment according to the present invention.
Figure 10A:
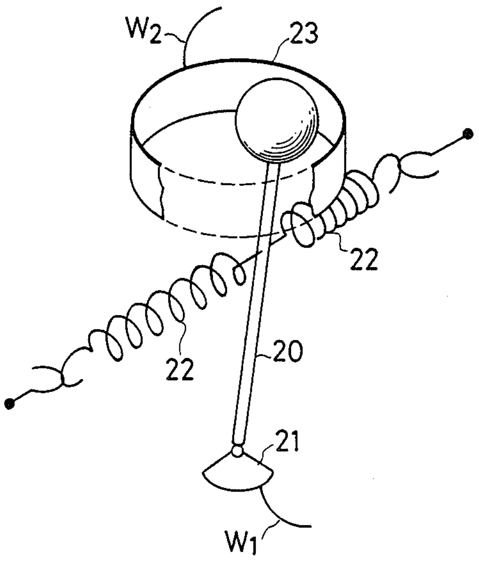
FIGS. 10A and 10B shows perspective views of the condition of the inclination detecting means shown in FIG. 9A.
Figure 10B:
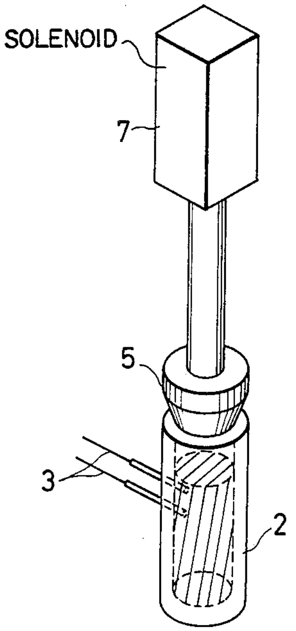

FIG. 9B shows an elecrical connection including the detector and the solenoid 7 of this embodiment. Referring to FIG. 9B, a printer main circuit 24, a printer power source switch 25, a printer protective circuit 26, a solenoid 7, a main switch 27 of the solenoid 7, and a subswitch 28 of the solenoid 7 are provided. The main switch 27 is interlinked with the printer power source switch 25. The subswitch 28 is turned on (i.e. closed) when the weight 19 of the detector does not contact the cylindrical electrode 23 (FIG. 9A). As is apparent from FIG. 9B, even when the soleniod 7 is energized during printer operation (i.e., even if the air-side end of the manometer 2 is open), when the printer is inclined exceeding a predetermined angle or is vibrated with a vibrating force exceeding a predetermined value, the weight 19 of the detector contacts the cylindrical electrode 23 (as shown in FIG. 10A), thereby turning off (i.e. opening) the subswitch 28. As a result, power supply to the solenoid 7 through the subswitch 28 is cut off, and the cap 5 is pushed into the air-side open end of the manometer 2, as shown in FIG. 10B, thereby preventing ink leakage from the manometer 2.

In this embodiment, an inverted pendulum-type inclination/vibration detector is shown. However, the detector is not limited to this in practicing the present invention.

An alarm or a display lamp can be provided in series with the responsive switch.

As described above, this embodiment has the inclination/vibration detector responsive to an inclination exceeding a predetermined angle or a vibrating force exceeding a predetermined value. Also, this embodiment has a subswitch of the solenoid in series with the main switch of the ink leakage preventive solenoid. The subswitch is turned off in accordance with the operation of the responsive switch of the detector. Therefore, even if the upper end of the manometer is open during printer operation, when the printer is inclined to exceed a predetermined angle or a vibrating force exceeding a predetermined value is applied to the printer, the open end of the manometer is immediately closed. As a result, no ink leakage occurs in the printer of the present invention.

I claim:

1. An ink-jet recording apparatus comprising:

a level gauge for communicating with both an ink storage means and the atmosphere in order to detect the remaining amount of recording ink in the ink storage means; and sealing means for shielding the interior of said level gauge from the atmosphere, wherein said sealing means is opened and closed in conjunction with the mounting and removal of the ink storage means.

2. An apparatus according to claim 1, wherein said sealing means is opened and closed in conjunction with the turning on and off of a main power source.

3. An apparatus according to claim 1, further comprising a switch for detecting mounting/removal of the ink storage means.

4. An apparatus according to claim 3, wherein said switch is a limit switch.

5. An apparatus according to claim 3, wherein said switch is a photointerrupter.

6. An apparatus according to claim 1, wherein said level gauge has a pair of electrodes for detecting the presence of ink.

7. An ink-jet recording apparatus comprising:

a level gauge for communicating with both an ink storage means and the atmosphere in order to detect the remaining amount or recording ink in the ink storage means; and sealing means for shielding the interior of said level gauge from the atmosphere, wherein said sealing means is opened and closed in conjunction with turning on and off a main power source.

8. An apparatus according to claim 7, wherein said level gauge has a pair of electrodes for detecting the presence of the ink.

9. An ink-jet recording apparatus comprising:

a level gauge for communicating with both an ink storage means and the atmosphere in order to detect the remaining amount of recording ink in the ink storage means;

sealing means for shielding the interior of said level gauge from the atmosphere; and suction means, communicating with said level gauge, for providing a suction force in said level gauge.

10. An apparatus according to claim 9, further comprising a recovery unit connected to said suction means for drawing by suction the ink from an orifice of a recording head having the orifice for discharging a liquid therethrough.

11. An ink-jet recording apparatus comprising:

a level gauge having an atmosphere-side opening for communicating with the atmosphere, wherein said level gauge also communicates with an ink storage means in order to detect the remaining amount of recording ink, in the ink storage means; and sealing means for shielding the interior of said level gauge from the atmosphere, wherein said sealing means comprises:

a cap for shielding the atmosphere-side opening of said level gauge;

an elastic member for biasing said cap against said atmosphere-side opening; and a lever for moving said cap.

12. An apparatus according to claim 11, wherein the lever is mounted in conjunction with movement of said ink storage means.

13. An apparatus according to claim 11, wherein said level has a pair of electrodes for detecting the presence of the ink.

14. An ink-jet recording apparatus comprising:
- a level gauge having an atmosphere-side opening for communicating with the atmosphere, wherein said level gauge also communicates with an ink storage means in order to detect the remaining amount of recording ink in the ink storage means; and
- sealing means for shielding the interior of said level gauge from the atmosphere, wherein said sealing means comprises:
- a cap for shielding the atmosphere-side opening of said level gauge; and
- a solenoid for moving said cap.

15. An apparatus according to claim 14, wherein said solenoid is operated upon mounting/removal of the ink storage means.

16. An apparatus according to claim 14, wherein said level gauge has a pair of electrodes for detecting the presence of the ink.

17. An ink-jet recording apparatus comprising:
- a level gauge for communicating with both an ink storage means and the atmosphere in order to detect a remaining amount of ink in the ink storage means;
- sealing means for shielding the interior of said level gauge from the atmosphere; and
- inclination detecting means for detecting an inclination or vibration of said apparatus when said apparatus is operating or is turned on, thereby controlling the operation of said sealing means.

18. An apparatus according to claim 17, wherein said level gauge has an atmosphere-side opening for communicating with the atmosphere, wherein said sealing means comprises:
- a cap for shielding the atmosphere-side opening of said level gauge; and
- a solenoid for moving a cap.

19. An apparatus according to claim 18, wherein said solenoid is operated upon mounting/removal of the ink storage means.

20. An apparatus according to claim 17, further comprising suction means communicating with said level gauge for applying a suction force in said level gauge.

* * * * *

UNITED STATES PATENT AND TRADEMARK OFFICE
CERTIFICATE OF CORRECTION

PATENT NO. : 4,772,900

DATED : September 20, 1988

INVENTOR(S) : SHIGEYASU NAGOSHI

It is certified that error appears in the above-identified patent and that said Letters Patent is hereby corrected as shown below:

COLUMN 1

Line 23, "gravity" should read --gravity,--.
Line 32, "of the" should read --of ink in the--.
Line 50, "from" should read --above--.
Line 53, "natural falling," should read --gravity,--.
Line 59, "is" should be deleted.
Line 60, "caused" should be deleted.

COLUMN 2

Line 6, "reliable" should read --reliably--.

COLUMN 3

Line 7, "reliable" should read --reliably--.

COLUMN 4

Line 11, "level 4" should read --lever 4--.
Line 39, "photo inter-" should read --photointer- --.

COLUMN 5

Line 4, "remainng" should read --remaining--.
Line 28, "flow pass lb." should read --flow path lb.--.
Line 36, "0" should read --O--.
Line 41, "discharge" (first occurrence) should read --discharged--.
Line 45, "pair path 9." should read --air path 9.--.
Line 52, "manometer 4" should read --manometer 2--.

UNITED STATES PATENT AND TRADEMARK OFFICE
CERTIFICATE OF CORRECTION

PATENT NO. : 4,772,900

DATED : September 20, 1988

INVENTOR(S) : SHIGEYASU NAGOSHI

It is certified that error appears in the above-identified patent and that said Letters Patent is hereby corrected as shown below:

COLUMN 6

Line 33, "replaced," should read --replacement,--.
Line 55, "or (function)" should read --(or function)--.
Line 67, "causes" should read --cause--.

COLUMN 7

Line 25, "elecrical" should read --electrical--.

COLUMN 8

Line 63, "the" should read --said--.
Line 64, "said" should read --the--.
Line 67, "level has" should read --level gauge has--.

COLUMN 10

Line 15, "a cap." should read -- said cap. --.

Signed and Sealed this

Eleventh Day of April, 1989

*Attest:*

DONALD J. QUIGG

*Attesting Officer*

*Commissioner of Patents and Trademarks*